United States Patent
Boe

(10) Patent No.: US 10,532,308 B2
(45) Date of Patent: Jan. 14, 2020

(54) METHOD AND SYSTEM FOR FILTER BAG UNIT ASSEMBLY AND FILTER BAG UNIT

(71) Applicant: Haldor Topsøe A/S, Kgs. Lyngby (DK)

(72) Inventor: Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 117 days.

(21) Appl. No.: 15/569,520

(22) PCT Filed: May 3, 2016

(86) PCT No.: PCT/EP2016/059881
§ 371 (c)(1),
(2) Date: Oct. 26, 2017

(87) PCT Pub. No.: WO2016/177725
PCT Pub. Date: Nov. 10, 2016

(65) Prior Publication Data
US 2018/0296959 A1    Oct. 18, 2018

(30) Foreign Application Priority Data
May 5, 2015    (EP) .................................... 15166402

(51) Int. Cl.
*B01D 46/02* (2006.01)
*B01D 46/04* (2006.01)
*F01N 3/035* (2006.01)
*B01D 46/00* (2006.01)

(52) U.S. Cl.
CPC ..... *B01D 46/0024* (2013.01); *B01D 46/0001* (2013.01); *B01D 46/0027* (2013.01); *B01D 46/02* (2013.01); *B01D 46/04* (2013.01); *F01N 3/035* (2013.01); *B01D 2275/10* (2013.01)

(58) Field of Classification Search
CPC .... B01D 46/04; B01D 46/02; B01D 46/0001; B01D 46/0024; B01D 46/0027; B01D 2275/10; F01N 3/035
USPC ........... 55/385.1, 371, 380, 381, 482, 341.5, 55/341.6, 373, 372, 378, 366, 367, 55/DIG. 2; 210/315, 448, 452
See application file for complete search history.

(56) References Cited

U.S. PATENT DOCUMENTS

| | | | | |
|---|---|---|---|---|
| 2,800,194 A | * | 7/1957 | Peek | .......................... A47L 9/14 55/380 |
| 3,596,441 A | * | 8/1971 | Lundahl | .................. F01N 3/021 55/376 |
| 4,769,052 A | * | 9/1988 | Kowalski | ............... B01D 46/06 210/315 |
| 5,417,855 A | | 5/1995 | Gershenson | |
| 5,636,422 A | * | 6/1997 | Pyron | .................... B01D 41/04 29/235 |
| 5,695,535 A | | 12/1997 | Hintenlang et al. | |
| 5,755,962 A | | 5/1998 | Gershenson et al. | |
| (Continued) | | | | |

FOREIGN PATENT DOCUMENTS

| | | |
|---|---|---|
| CN | 2211314 Y | 11/1995 |
| CN | 1125156 A | 6/1996 |
| (Continued) | | |

*Primary Examiner* — Minh Chau T Pham
(74) *Attorney, Agent, or Firm* — Blank Rome LLP

(57) ABSTRACT

A method and a system to assemble a plurality of filter bags within one another using a pole and a pulling guide, and a filter bag unit which includes a plurality of assembled filter bags with creases and stitches oriented relative to each other.

14 Claims, 1 Drawing Sheet

Filter bag assembly system

(56) References Cited

U.S. PATENT DOCUMENTS

| | | | |
|---|---|---|---|
| 6,179,888 B1 | 1/2001 | Mangiaforte | |
| 6,991,665 B1 * | 1/2006 | Allen | B01D 46/008 210/315 |
| 7,922,905 B2 * | 4/2011 | Grodecki | B01D 29/39 210/231 |
| 8,182,564 B2 * | 5/2012 | Howard | B01D 46/02 55/371 |
| 8,506,664 B2 * | 8/2013 | Linhart | B01D 46/02 123/198 E |
| 2002/0056680 A1 | 5/2002 | Bourgeois | |
| 2005/0155334 A1 * | 7/2005 | Pearson | B01D 29/23 55/380 |
| 2014/0246055 A1 | 9/2014 | Ebert et al. | |

FOREIGN PATENT DOCUMENTS

| | | |
|---|---|---|
| CN | 101590348 A | 12/2009 |
| CN | 103432835 A | 12/2013 |
| JP | 2003-126654 A | 5/2003 |

* cited by examiner

Filter bag assembly system
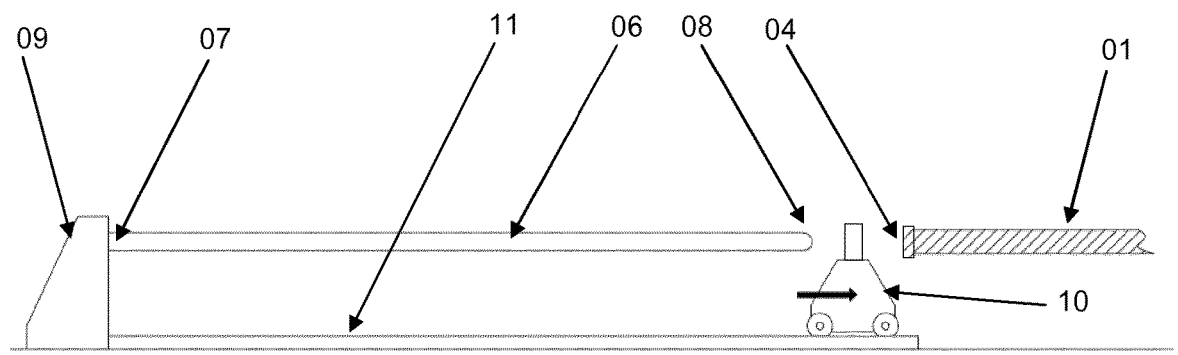
Situation 1
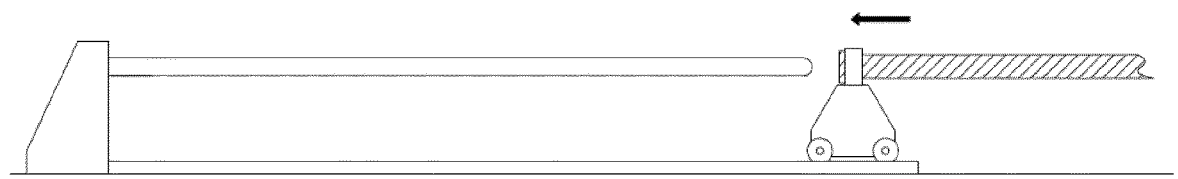
Situation 2
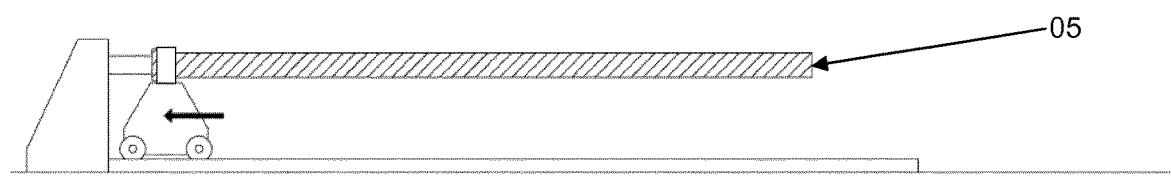
Situation 3
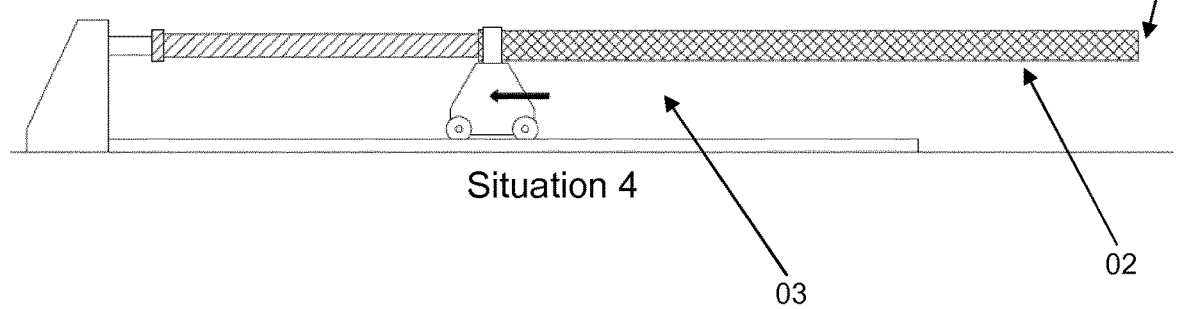
Situation 4

METHOD AND SYSTEM FOR FILTER BAG UNIT ASSEMBLY AND FILTER BAG UNIT

BACKGROUND OF THE INVENTION

1. Field of the Invention

The present invention relates to a method and system for the assembly of multiple filter bags within each other. Further the invention relates to a filter bag unit assembly comprising a plurality of filter bags which are mounted within one another. More particular, the present invention relates to filter bags which are impregnated with catalyst and assembled in a multilayer unit for effective filtration and catalytic cleaning of exhaust gas.

2. Description of the Related Art

Filter bags for separating particulate matter from a fluid is known in the art. In challenging applications there may be a need to apply a catalyst to the filter bags to obtain not only mechanical filtration of the particles in the fluid, but also catalytic cleaning of the flue gas or product gas in question. To achieve sufficient catalyst for the catalytic cleaning, there is a need to apply two or more filter bags within each other in a multilayer unit, thereby providing sufficient effective catalytic cleaning of the gas. Further With growing environmental protection rules, this is the problem in some systems with a high particle load in the gas stream e.g. cement production processes.

It is known in the art to provide filter bag assemblies with a plurality of filter bags mounted within one another. U.S. Pat. No. 5,755,962 discloses a pre-filter bag for insertion into a standard filtration bag apparatus, having a filtration assembly comprising a seamless filter membrane having uniform pore openings preselected within the range of between about 2 and about 50 microns (mu) and a linearly channelled, non-deformable, semi-rigid liquid transport thermoplastic sheet in the form of a moulded webbing or netting in contact with the upper surface of the filter membrane; said webbing having marginal edges which are coextensive with those of the membrane; said assembly adapted to be shaped by continuous winding.

In U.S. Pat. No. 5,417,855 a filter apparatus having a filter bag subassembly for collecting contaminating material is described. The filter bag sub-assembly includes five diametrically and axially-spaced bags and an integral collar. The five spaced bags form five spaced chambers and the integral collar has a stepped shape forming five cylinder support portions for the five spaced bags.

US2002056680 discloses a filter assembly including a filter vessel having an inlet and an outlet and defining a filter chamber there between. A basket assembly is removable supported within the filter chamber. The basket assembly has a diameter less than the diameter of the filter chamber so as to define an annular flow passage about the basket assembly. The basket assembly includes an outer permeable member and an inner permeable member having a diameter which is less than the diameter of the outer permeable member such that the inner permeable member is received within the outer permeable member.

U.S. Pat. No. 6,179,888 describes a filter bag assembly of hybrid construction is disclosed that reduces the height of the filter bag assembly as well as its overall cost. The assembly indicates an elongated filter body portion, an end cap closing at one end of the filter body, a collar disposed at the other end of the filter body. The collar is molded onto the filter body and an inner venturi portion molded therewith. The assembly also includes a fabric extension portion that is attached to the interior of the collar.

To mount the multiple filter bag units in a filter house is cumbersome and time-consuming. A known method is to first mount the outermost filter bag and thereafter mount the one or more inner filter bags by pressing them one at a time into the outer filter bag by means of a filter basket or other suitable tool. The present invention offers a solution to this problem by a method of assembly of a plurality of filter bags within each other. The present invention further presents a system for assembly of a plurality of filter bags within each other and a unit of assembled filter bags with inventive features with advantages over the known art.

SUMMARY OF THE INVENTION

Accordingly, the invention provides a method for assembly of a plurality of filter bags within each other comprising the steps of pulling a first filter bag on a pole until the filter bag is stretched in its length over said pole. Pulling at least a second filter bag over the first filter bag until the second filter bag is stretched in its length over the first filter bag and the pole. Retracting the assembled plurality of filter bags as one unit from the pole.

In an embodiment, the invention further comprises pulling a third filter bag over the first and second filter bag until the third filter bag is stretched in its length over the first filter bag, the second filter bag and the pole, before the step of retracting the assembled plurality of filter bags as one unit from the pole.

In a further embodiment, a first open end of each of the filter bags is attached to a pulling guide before they are being pulled. The pulling guide may comprises a claw or have a variable geometry adapted to connect to said first open end of each of said filter bags. The pulling guide can be adapted to pull the filter bags by means of an actuator. Further the pulling guide may automatically release each of the filter bags when they have been pulled over the pole and then automatically return to its start position, ready to pull a further filter bag.

In an embodiment of the invention, the pole has a maximum outer diameter which is smaller than the inner diameter of any of the filter bags. More specifically, the pole may have a maximum outer diameter which is between 2 mm and 100 mm, preferably between 2 mm and 40 mm smaller than the inner diameter of any of the filter bags. The pole can be mounted horizontally, fixed at a first end and with the second end and the length of the pole hanging freely. The second end of the pole can have a circular shaped head with rounded edges.

In an embodiment, this invention comprises a unit of assembled filter bags comprising at least two filter bags, one pulled over the other, each of the filter bags comprises longitudinal creases and at least one longitudinal stitch. The filter bags are assembled one within the other with the orientation of the longitudinal creases of one filter bag matching the orientation of the longitudinal creases of the one or more further filter bags in the unit, and the stitch of each filter bag in the unit is oriented differently than the stitch of the one or more other filter bags in the unit with respect to the longitudinal creases.

In a further embodiment, the unit of assembled filter bags has at least one filter bag which is catalyzed. The open end of each filter bag in the unit may be snap locked together with the one or more other filter bags in the unit.

In a particular embodiment, the unit of assembled filter bags consists of three filter bags assembled within each other.

The filter bags may have a flat shape with two longitudinal creases, and a longitudinal stitch. Further, each filter bag may have at least one strap for handling placed at its closed end.

The invention also has an embodiment which is a filter bag assembly system. It comprises a pole for inserting within a filter bag, a movable guide for releasable connection to a first open end of a filter bag and pulling the filter bag, and an actuator for moving said guide along said pole. The pole is at least as long as the filter bag to be pulled and the maximum diameter of said pole is smaller than the inner diameter of the filter bag to be pulled.

In an embodiment of the invention, the guide has a variable geometry adapted to connect to the first open end of a filter bag. The pulling distance of the guide can be adapted to fit the filter bag length, and the guide releases the filter bag when it has been pulled in its length over the pole, where after the guide returns to its starting position, ready to pull another filter bag. The filter bag assembly system may have a pulling force of the guide which is variable and adapted to be set, and the pulling of the guide stops if the pulling force exceeds the set value of the pulling force. The system may comprise a plurality of sets of poles and pulling guides.

BRIEF DESCRIPTION OF THE DRAWINGS

A more detailed description of the method and system will be apparent from the following description of a specific embodiment with reference to the drawing where FIG. 1 shows a step by step performing of a specific embodiment of the invention.

DETAILED DESCRIPTION OF THE PREFERRED EMBODIMENTS

Position Numbers

01. First filter bag.
02. Second filter bag.
03. Filter bag unit.
04. First open end of filter bag.
05. Second closed end of filter bag.
06. Pole.
07. First end of pole.
08. Second end of pole.
09. Pole fixture.
10. Pulling guide.
11. Pulling guide tracks.

Referring now to FIG. 1, a filter bag assembly system is shown in four different situations where a unit of filter bags 03 (in this embodiment two bags in total) is assembled. In the top situation, the pole 06 is hanging freely in a horizontal position fixed at the first end of the pole 07 by the pole fixture 09. The pole is ready to receive a first filter bag 01 which may be provided after catalyst impregnation and drying (not shown). A pulling guide 10 is moved towards the first filter bag (indicated by the arrow) by means of an actuator (not shown). The actuator can be of any kind known in the art, e.g. a belt drive, chain drive, a piston or the like. The pulling guide can move on horizontal pulling guide tracks 11. The pulling guide is adapted to attach to the first open end of the filter bag 04 by means of a claw, a variable geometry such as a crib shape or any suitable connection means (not shown).

In the second situation of FIG. 1, the pulling guide has been connected to the first open end of the filter bag and is now pulling the first filter bag towards the pole, as indicated by the arrow. The pulling guide is adapted in height and side wards position to center the first end of the filter bag with the pole. The pulling guide continues to pull the first filter bag onto the pole, the bag enclosing the pole, until the second closed end of the filter bag 05 contacts the second end of the pole 08 as seen in the third situation of FIG. 1. The travelling distance of the pulling guide may be controlled by any suitable means such as a physical or electronics stop of the pulling guide which corresponds to the length of the first filter bag or by means of a maximum pulling force measurement or the like as common known in the art (not shown).

In the fourth situation of FIG. 1 a second filter bag 02 is pulled onto the first filter bag which is still hanging on the pole in a manner corresponding to the pulling of the first filter bag. The dimension of the open end of the second filter bag and the inner dimension of the second filter bag is adapted to fit onto the first filter bag. Further the open ends of the first and the second filter bags may be provided with fittings (not shown) which allow them to be fixed together when the second filter bag has been pulled onto the first filter bag.

The invention claimed is:

1. Method for assembly of a plurality of filter bags within each other comprising the steps of:
    pulling a first filter bag on a pole until said filter bag is stretched in its length over said pole,
    pulling at least a second filter bag over the first filter bag until said at least second filter bag is stretched in its length over said first filter bag and said pole, and
    retracting the assembled plurality of filter bags as one unit from the pole,
    wherein the filter bags to be pulled have a flat shape with two longitudinal creases, and a longitudinal stitch, and wherein the stitch of each filter bag in a unit of assembled plurality of filter bags is oriented differently with respect to the longitudinal creases, and
    wherein a first open end of each of said filter bags is attached to a pulling guide before they are being pulled, said pulling guide automatically releasing each of the filter bags when they have been pulled over the pole, said pulling guide then automatically returning to its start position, ready to pull a further filter bag.

2. Method according to claim 1 further comprising the step of pulling a third filter bag over the first and second filter bag until said third filter bag is stretched in its length over said first filter bag, said second filter bag and said pole, before the step of retracting the assembled plurality of filter bags as one unit from the pole.

3. Method according to claim 1, wherein said pulling guide comprises a claw.

4. Method according to claim 1, wherein said pulling guide has a variable geometry adapted to connect to said first open end of each of said filter bags.

5. Method according to claim 1, wherein said pulling guide pulls said filter bags by means of an actuator.

6. Method according to claim 1, wherein said pole has a maximum outer diameter which is smaller than the inner diameter of any of said filter bags.

7. Method according to claim 1, wherein said pole has a maximum outer diameter which is between 2 mm and 100 mm, preferably between 2 mm and 40 mm smaller than the inner diameter of any of said filter bags.

8. Method according to claim 1, wherein said pole is mounted horizontally, fixed at a first end and with the second end and the length of the pole hanging freely, and wherein the second end of the pole has a circular shaped head with rounded edges.

9. Method according to claim 1, wherein each filter bag has at least one strap for handling placed at its closed end.

10. Filter bag assembly system comprising a pole for inserting within a filter bag, a movable guide for releasable connecting to a first open end of a filter bag and pulling the filter bag, and an actuator for moving said guide along said pole, wherein said pole is at least as long as the filter bag to be pulled and wherein the maximum diameter of said pole is smaller than the inner diameter of the filter bag to be pulled, wherein the guide is adapted in height and side wards position to center the first open end of the filter bag with the pole.

11. Filter bag assembly system according to claim 10, wherein the guide has a variable geometry adapted to connect to said first open end of a filter bag.

12. Filter bag assembly system according to claim 10, wherein the pulling distance of the guide can be adapted to fit the filter bag length, and wherein the guide releases the filter bag when it has been pulled in its length over the pole, where after the guide returns to its starting position, ready to pull another filter bag.

13. Filter bag assembly system according to claim 10, wherein the pulling force of the guide is variable and adapted to be set, and wherein the pulling of the guide stops if the pulling force exceeds the set value of the pulling force.

14. Filter bag assembly system according to claim 10, wherein the system comprises a plurality of sets of poles and pulling guides.

* * * * *